United States Patent
Chang

(10) Patent No.: US 8,102,922 B2
(45) Date of Patent: Jan. 24, 2012

(54) DEMODULATOR DEVICE AND DEMODULATION METHOD FOR REDUCING PCR JITTER

(75) Inventor: Tien-Hsin Chang, Tainan (TW)

(73) Assignee: Himax Technologies Limited (TW)

( * ) Notice: Subject to any disclaimer, the term of this patent is extended or adjusted under 35 U.S.C. 154(b) by 634 days.

(21) Appl. No.: 12/241,562

(22) Filed: Sep. 30, 2008

(65) Prior Publication Data

US 2010/0079678 A1    Apr. 1, 2010

(51) Int. Cl.
*H04B 1/66* (2006.01)

(52) U.S. Cl. ........................... 375/241; 375/262

(58) Field of Classification Search .................. 375/241
See application file for complete search history.

(56) References Cited

U.S. PATENT DOCUMENTS

| | | | |
|---|---|---|---|
| 2005/0138521 A1* | 6/2005 | Suzuki et al. | 714/755 |
| 2005/0257112 A1* | 11/2005 | Baliga et al. | 714/746 |
| 2005/0259695 A1* | 11/2005 | Nemiroff et al. | 370/517 |
| 2009/0080545 A1* | 3/2009 | Nicolas | 375/260 |
| 2009/0270025 A1* | 10/2009 | Kossi et al. | 455/3.01 |
| 2010/0034140 A1* | 2/2010 | Song et al. | 370/328 |
| 2010/0086013 A1* | 4/2010 | Pare et al. | 375/219 |

* cited by examiner

*Primary Examiner* — Chieh M Fan
*Assistant Examiner* — Santiago Garcia
(74) *Attorney, Agent, or Firm* — Baker & McKenzie LLP

(57) ABSTRACT

A demodulator device for a digital TV receiver includes a symbol-deinterleaver performing symbol-based deinterleaving, a bit-deinterleaver performing bit-based deinterleaving, a demapper performing demapping, and a Viterbi decoder performing Viterbi decoding, wherein one of the symbol-deinterleaver, the bit-deinterleaver, and the demapper includes a memory storing data that has undergone symbol-deinterleaving, and another one of the symbol-deinterleaver, the bit-deinterleaver, and the demapper or the Viterbi decoder reads the data that has undergone symbol-deinterleaving with an adaptively optimized throughput rate.

17 Claims, 10 Drawing Sheets

| Mode | Guard Interval | N |
|------|---------------|---|
| 2K | 1/4 | C |
| 2K | 1/8 | B |
| 2K | 1/16 | A |
| 2K | 1/32 | A |
| 8K | 1/4 | C |
| 8K | 1/8 | B |
| 8K | 1/16 | A |
| 8K | 1/32 | A |

FIG. 3

DEMODULATOR DEVICE AND DEMODULATION METHOD FOR REDUCING PCR JITTER

BACKGROUND

1. Technical Field

The invention relates to a demodulator device and, more particularly, to a demodulator device for a digital TV receiver and a demodulation method for a digital TV receiver.

2. Related Art

Digital Video Broadcasting—Terrestrial (DVB-T) standard is a DVB European consortium standard for broadcast transmission of digital terrestrial television. This system transmits a compressed digital audio/video stream, using OFDM modulation with concatenated channel coding (i.e. COFDM). The adopted source coding method, for example, is Moving Picture Experts Group (MPEG) standard, number 2 (commonly called "MPEG-2"), as defined in standard ISO/IEC 13818-1: 1996, promulgated by the ISO/IEC.

A MPEG-2 transport stream involves transmission of video and audio information in transport stream packets of 188 bytes in length. Each packet includes a header, which contains control information, and a payload, which contains video or audio information. The MPEG-2 transport stream may carry multiple different programs simultaneously. Each packet in the transport stream is associated with a program by a packet identifier (PID) contained in the header. The header is of variable length, depending on whether it contains an adaptation field. The adaptation field contains control information that is not necessarily present in every transport stream packet.

However, the MPEG-2 transport stream may exhibit high PCR jitter due to different communication conditions, thus affecting the operations in the MPEG decoder or processor. Conventional technology for reducing PCR jitter in the transport stream is using an extra PCR buffer for storing demodulated bit streams and outputting the same in a regular order. However, the PCR buffer size is large, for example, 20*199*8*2=60160 bits in worst case of 64 QAM and code rate equal to 7/8, resulting in high cost in VLSI implementation. A low-cost solution for PCR jitter reduction in a demodulator is thus highly demanded.

SUMMARY

A demodulator device and demodulation method for reducing PCR jitter is described herein.

In one aspect, a demodulator device for a digital TV receiver includes a symbol-deinterleaver performing symbol-based deinterleaving, a bit-deinterleaver performing bit-based deinterleaving, a demapper performing demapping, and a Viterbi decoder performing Viterbi decoding, wherein one of the symbol-deinterleaver, the bit-deinterleaver, and the demapper includes a memory storing data that has undergone symbol-deinterleaving, and another one of the symbol-deinterleaver, the bit-deinterleaver, and the demapper or the Viterbi decoder reads the data that has undergone symbol-deinterleaving with an adaptively optimized throughput rate.

In another aspect, a demodulation method for a digital TV receiver includes performing symbol-based deinterleaving, performing bit-based deinterleaving, performing demapping, and performing Viterbi-decoding, wherein one of the symbol-based deinterleaving, the bit-based deinterleaving, and the demapping steps includes storing data that has undergone symbol-deinterleaving, and another one of the symbol-based deinterleaving, the bit-based deinterleaving, and the demapping steps or the Viterbi-decoding step reads the data that has undergone symbol-deinterleaving with an adaptively optimized throughput rate.

These and other features, aspects, and embodiments are described below in the section "Detailed Description."

BRIEF DESCRIPTION OF THE DRAWINGS

Features, aspects, and embodiments are descried in conjunction with the attached drawings, in which:

FIG. 3 is an exemplary look-up table in accordance with one embodiment;

DETAILED DESCRIPTION

Figure 1:
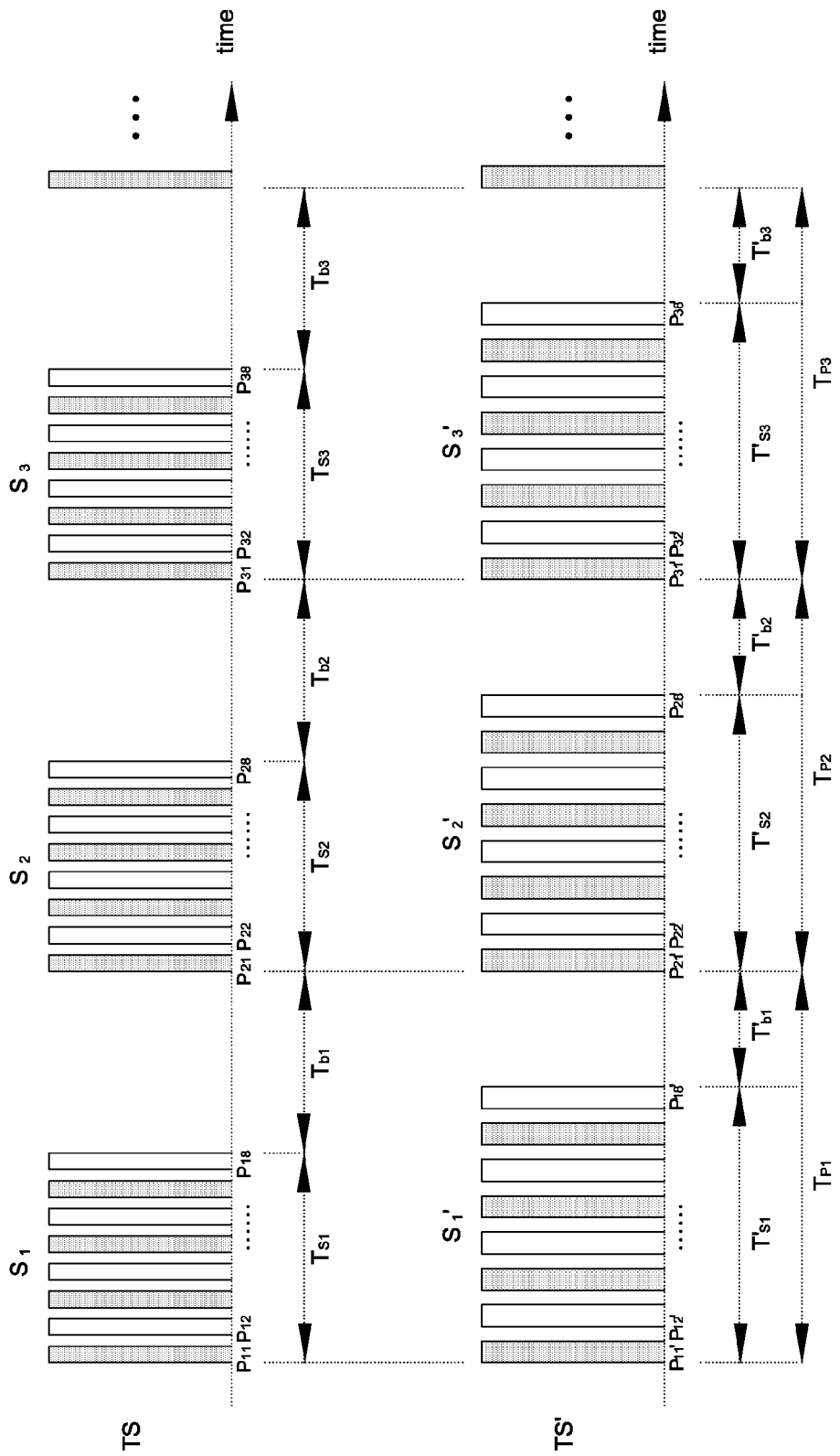
FIG. 1 is a signal diagram of an exemplary PCR jitter reduction within a transport stream in accordance with one embodiment.

FIG. 1 is a signal diagram of an exemplary PCR jitter reduction within a transport stream in accordance with one embodiment. In FIG. 1, a transport stream TS, i.e., a MPEG transport stream, can undergo demodulation without PCR-jitter reduction. For example, the transport stream TS can be formed by a sequence of symbols $S_1$-$S_n$, where n is an integer, wherein $S_1$-$S_3$ are shown in more detail. Each of the symbols $S_i$ ($1 \leq i \leq n$) can be further formed by a sequence of packets $P_{i1}$-$P_{im}$, where m=8, for example. As clearly shown, bursts of the symbols $S_1$-$S_3$, represented by time intervals $T_{b1}$-$T_{b3}$, can result in high PCR jitter. The greater the time intervals $T_{b1}$-$T_{b3}$, the greater the PCR jitter in the transport stream TS.

In FIG. 1, a transport stream TS' has undergone demodulation with PCR-jitter reduction, wherein the time intervals $T_{b1}$-$T_{b3}$ can be reduced within the transport stream TS', and hence symbols $S_1'$-$S_{b3}'$ exhibit more uniform distribution. Accordingly, the PCR jitter of the transport stream TS' can be reduced compared to the transport stream TS. In addition, symbol lengths $T_{S1}'$-$T_{S3}'$ of transport stream TS' can be greater than symbol lengths $T_{S1}$-$T_{S3}$ of transport stream TS, while the symbol periods of the transport streams TS and TS' can both be equal to $T_{P1}$-$T_{P3}$. According to an exemplary demodulation process for reducing PCR-jitter, the time intervals $T_{b1}$-$T_{b3}$ can be reduced simply by storing a sequence of symbols that have undergone symbol-deinterleaving process, and reading of the sequence of symbols can be accomplished with a reduced throughput rate, as will be described in detail below.

Figure 2:
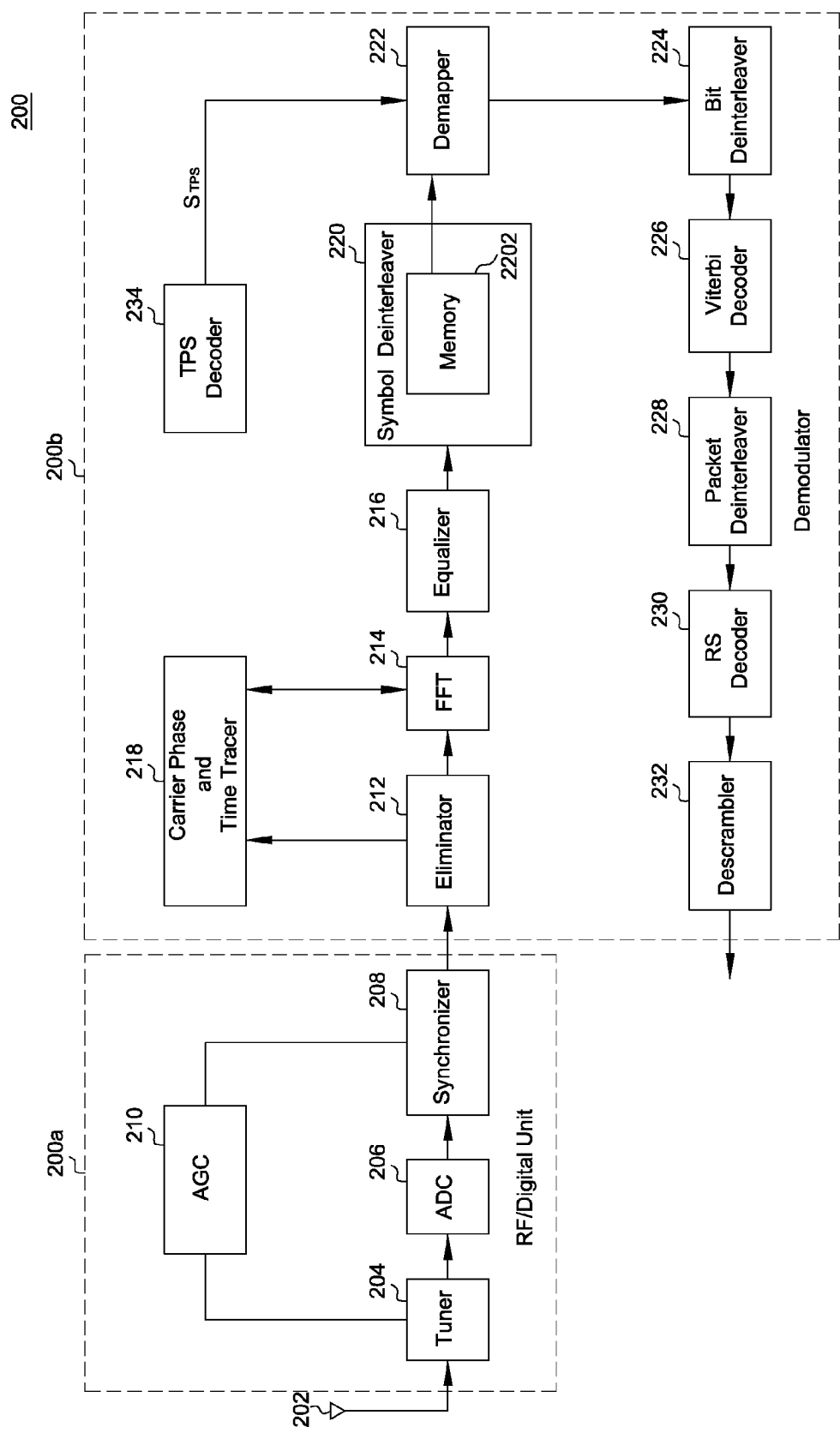
FIG. 2 is a schematic block diagram of an exemplary receiver/demodulator device in accordance with one embodiment.

FIG. 2 is a schematic block diagram of an exemplary receiver/demodulator device in accordance with one embodiment. In FIG. 2, a receiver 200 can include an RF/digital unit 200a for amplifying and converting an analog RF signal received through an antenna 202 to base-band and converting the amplified analog signal into a digital signal, and a demodulator 200b for performing demodulation. For example, the receiver 200 can include a DVB-T receiver, and the demodulator 200b can be an OFDM demodulator for performing OFDM demodulation.

In FIG. 2, the RF/digital unit 200a can be configured to include a tuner 204, an analog-to digital converter (ADC) 206, a synchronizer 208, and an automatic gain controller (AGC) 210. The tuner 204 can amplify the analog RF signal received through the antenna 202, and can convert the amplified analog signal into a base-band signal and filter the base-band signal. The ADC 206 can convert the based-band signal into the digital signal. The synchronizer 208 can perform digital signal processing, such as frame synchronization, symbol synchronization, and the like. The automatic gain controller (AGC) 210 can control a gain of the tuner 204 to be suitable for the digital signal processing.

In FIG. 2, the OFDM demodulator 200b can be configured to include an eliminator 212, a Fast Fourier Transform (FFT) unit 214, an equalizer 216, a carrier phase and time tracer 218, a symbol deinterleaver 220, a demapper 222, a bit deinterleaver 224, a Viterbi decoder 226, a packet deinterleaver (or referred to as external deinterleaver) 228, a Reed-Solomon (RS) decoder 230, and a descrambler 232. The eliminator 212 can be implemented for eliminating a Guard Interval (GI) and Cyclic Prefix (CP) signal, and the Fast Fourier Transform (FFT) unit 214 can transform a time domain signal into a frequency domain signal. In addition, the equalizer 216 can compensate for distortion caused in amplification or transmission, and the carrier phase and time tracer 218 can trace a phase and a time of a carrier. The symbol deinterleaver 220 can provide symbol-based deinterleaving on a block basis, and the demapper 222 can convert the symbol-deinterleaved data constituted by complex number vectors (QPSK, 16 QAM or 64 OAM) to a simple bit stream. Furthermore, the bit deinterleaver 224 can provide bit-based deinterleaving, that is, a bit-wise deinterleaving, and the Viterbi-decoder 226 can perform a Viterbi-decoding to reverse a coding process that has been performed by an internal/convolutional coder at a transmitter. The packet deinterleaver 228 can include a convolutional deinterleaver applying packet-based deinterleaving, that is, byte-wise deinterleaving within each packet. The RS-decoder 230 can reverse a coding process that has been performed by a RS coder at the transmitter to correct a transmission error. More specifically, the RS decoder 230 can generate 188-byte packets from 204-byte packet received, wherein up to eight random errors per packet can be corrected. The descrambler 232 can descramble the decoded data for removing energy dispersal that has been performed in the transmitter and recovering an original serial bit stream. Then, the descrambler 232 can provide the recovered serial bit stream as a final output stream of the demodulator 200b.

The symbol deinterleaver 220 can include a symbol-deinterleaving memory 2202 for storing symbol-deinterleaved data. Here, the demapper 222 can receive the symbol-deinterleaved data from the symbol-deinterleaving memory 2202 and then demap the symbol-deinterleaved data. After the symbol deinterleaver 220 finishes deinterleaving one symbol, it can store the symbol-deinterleaved data in the symbol-deinterleaving memory 2202, and can notify the demapper 222 to start reading and demapping the symbol-deinterleaved data. The demapper 222 can take 48 blocks from the symbol-deinterleaving memory 2202 to finish an OFDM symbol in the 8K transmission mode, and 12 blocks to finish an OFDM symbol in the 2K transmission mode. Since each OFDM symbol can include 6048 data words in the 8K transmission mode and 1512 data words in the 2K transmission mode, the demapper 222 can read the symbol-deinterleaving memory 2202 with a throughput rate=1/(N*6048) in the 8K transmission mode and 1/(N* 1512) in the 2K transmission mode, where the parameter N can be a fixed integer determined according to system structure and timing design and, for example, is fixed to 9. However, the parameter can be increased, i.e., N>9, to decrease the throughput rate. As discussed above in conjunction with FIG. 1, reduction of the throughput rate leads to the benefit of PCR jitter reduction. Preferably, the throughput rate can be minimized under the condition that any deinterleaved symbol in the symbol-deinterleaving memory 2202 is not covered by a succeeding deinterleaved symbol before it is outputted from the symbol-deinterleaving memory 2202.

Preferably, the demapper 222 can adaptively optimize its reading rate, i.e., throughput rate, to make the demodulated output stream more uniform, i.e., with lower PCR jitter, so as to adapt to various transmission conditions. To accomplish this, the demapper 222 is at least able to adaptively optimize its reading rate according to transmission parameters of the transport stream such that the demodulation can provide the best PCR-jitter reduction. For example, in a DVB-T system, the transmission parameters can include frame number, constellation (QPSK, 16-QAM or 64-OAM), hierarchy information (whether the data are coded in normal or hierarchical mode with an additional parameter α), code rate (1/2, 2/3, 3/4, 5/6, 7/8), guard interval (1/32, 1/16, 1/8, 1/4), transmission mode (2K or 8K), frame number, and cell identification. Accordingly, the demapper 222 can adaptively optimize its reading rate according to at least one of these transmission parameters. For example, the demapper 222 can adaptively optimize its reading rate according to transmission mode and guard interval.

In FIG. 2, the OFDM demodulator 200b can include a Transmission Parameter signal (TPS) decoder 234. The TPS decoder 234 can receive a frequency component from the FFT 214, recover the information carried by certain carriers of the signal received, and provide a TPS signal $S_{TPS}$ representing the recovered information to the demapper 222. The information can include transmission parameters of the transport stream $S_{TS}$. Then, the demapper 222 can adaptively optimize its reading rate according to the transmission parameters carried by the TPS signal $S_{TPS}$.

To accomplish optimization of the reading rate according to the transmission parameters, the demapper 222 can refer to a look-up table recording optimal values of throughput rates, or the parameter N, corresponding to different combinations of the transmission parameters, wherein the optimal values can provide best PCR-jitter reduction. For example, the optimal values can be obtained by realistic test and measurement. However, there are various implementations of the look-up table. For example, the look-up table can be implemented as a multiplexer receiving the TPS signal $S_{TPS}$ and can provide a rate control signal controlling the reading rate of the demapper 222 to be the optimal value.

FIG. 3 is an exemplary look-up table in accordance with one embodiment. In FIG. 3, the look-up table can be where the demapper 222 adaptively optimizes its reading rate according to transmission mode and guard interval. As shown, the values of the parameter N corresponding to all combinations of transmission parameters can be denoted by integers A, B, and C, where A, B and C represent 10, 11 and 12, respectively, all exceeding a determined value, such as 9.

Here, reduction or minimization of throughput rate is not necessarily required to be performed between the symbol deinterleaver 220 and the demapper 222. It may only be required that reduction/minimization of throughput ratio is performed for reading data that has undergone symbol-deinterleaving.

Figure 4:
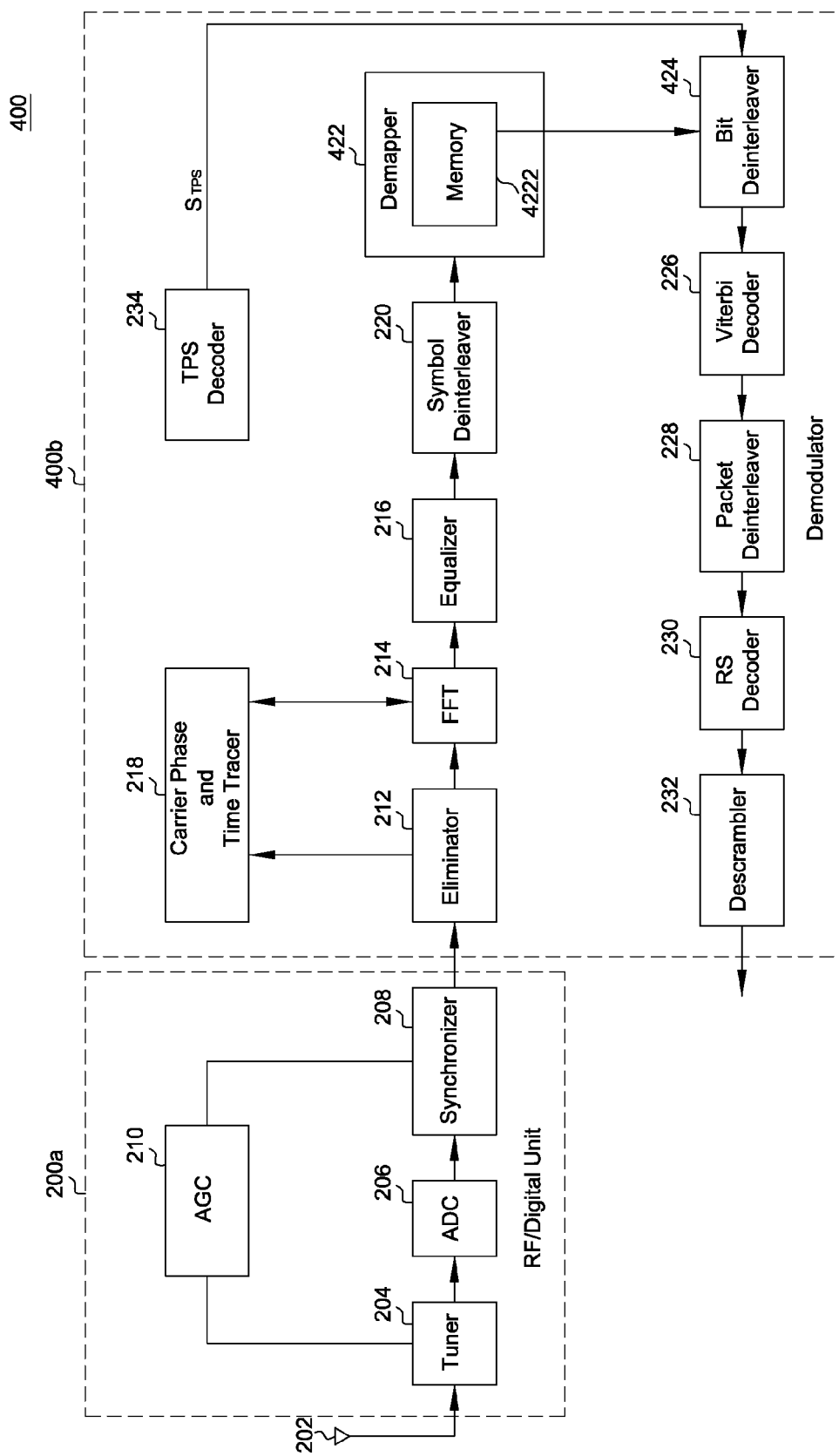
FIG. 4 is a schematic block diagram of another exemplary receiver/demodulator device in accordance with another embodiment.

FIG. 4 is a schematic block diagram of another exemplary receiver/demodulator device in accordance with another embodiment. In FIG. 4, a receiver 400 can be similar to the receiver 200 (in FIG. 2), but can be configured to include a demodulator 400b, wherein reduction or minimization of throughput rate can be performed between a demapper 422 and a bit deinterleaver 424 rather than between the symbol deinterleaver 220 and the demapper 222, as in FIG. 2. For example, the demapper 422 can include a demapper memory 4222 for storing demapped bit streams, wherein the demapped bit streams have undergone symbol-deinterleaving in the symbol deinterleaver 220. The bit deinterleaver 424 can read the demapped bit streams from the demapper memory 4222 with a reduced or minimized throughput rate. For example, the bit deinterleaver 424 can adaptively optimize its reading rate (throughput rate), or by reference to a look-up table. For the sake of brevity, the descriptions of other elements of FIG. 4 similar to those corresponding to FIG. 2 are omitted.

Figure 5:
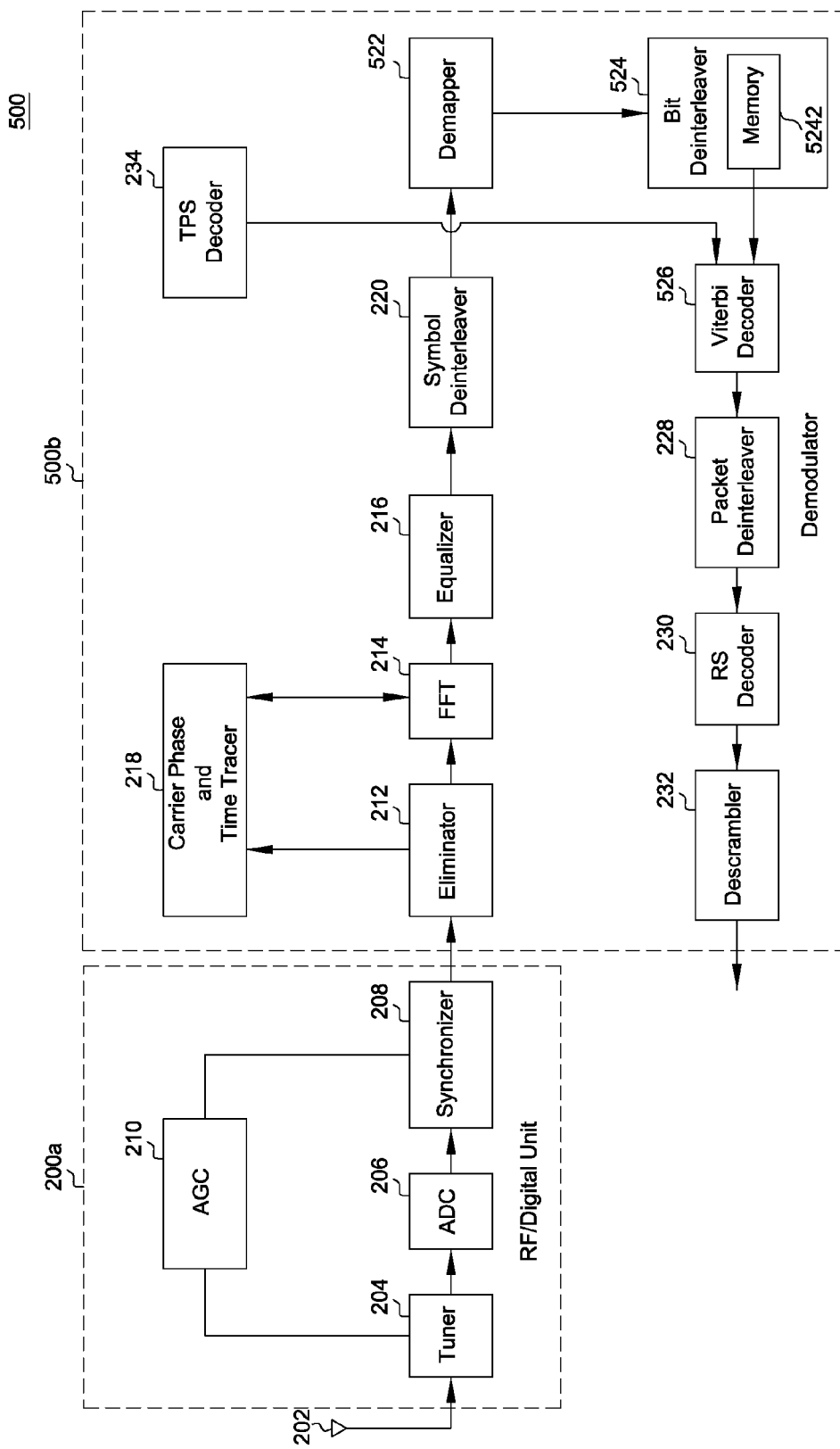
FIG. 5 is a schematic block diagram of another exemplary receiver/demodulator device in accordance with another embodiment.

FIG. 5 is a schematic block diagram of another exemplary receiver/demodulator device in accordance with another embodiment. In FIG. 5, a receiver 500 can be similar to the receiver 200 (in FIG. 2), but can be configured to include a demodulator 500b, wherein reduction or minimization of throughput rate can be performed between the bit deinterleaver 524 and the Viterbi decoder 526 rather than between the symbol deinterleaver 220 and the demapper 222, as in FIG. 2. For example, the bit deinterleaver 524 can include a bit-deinterleaving memory 5242 for storing bit-deinterleaved bit streams, wherein the bit-deinterleaved bit streams have undergone symbol-deinterleaving in the symbol deinterleaver 220. The Viterbi decoder 526 can read the bit-deinterleaved bit streams from the bit-deinterleaving memory 5242 with a reduced or minimized throughput rate. For example, the Viterbi decoder 526 can adaptively optimize its reading rate, or by reference to a look-up table. For the sake of brevity, the descriptions of other elements of FIG. 5 similar to those corresponding to FIG. 2 are omitted.

Figure 6:
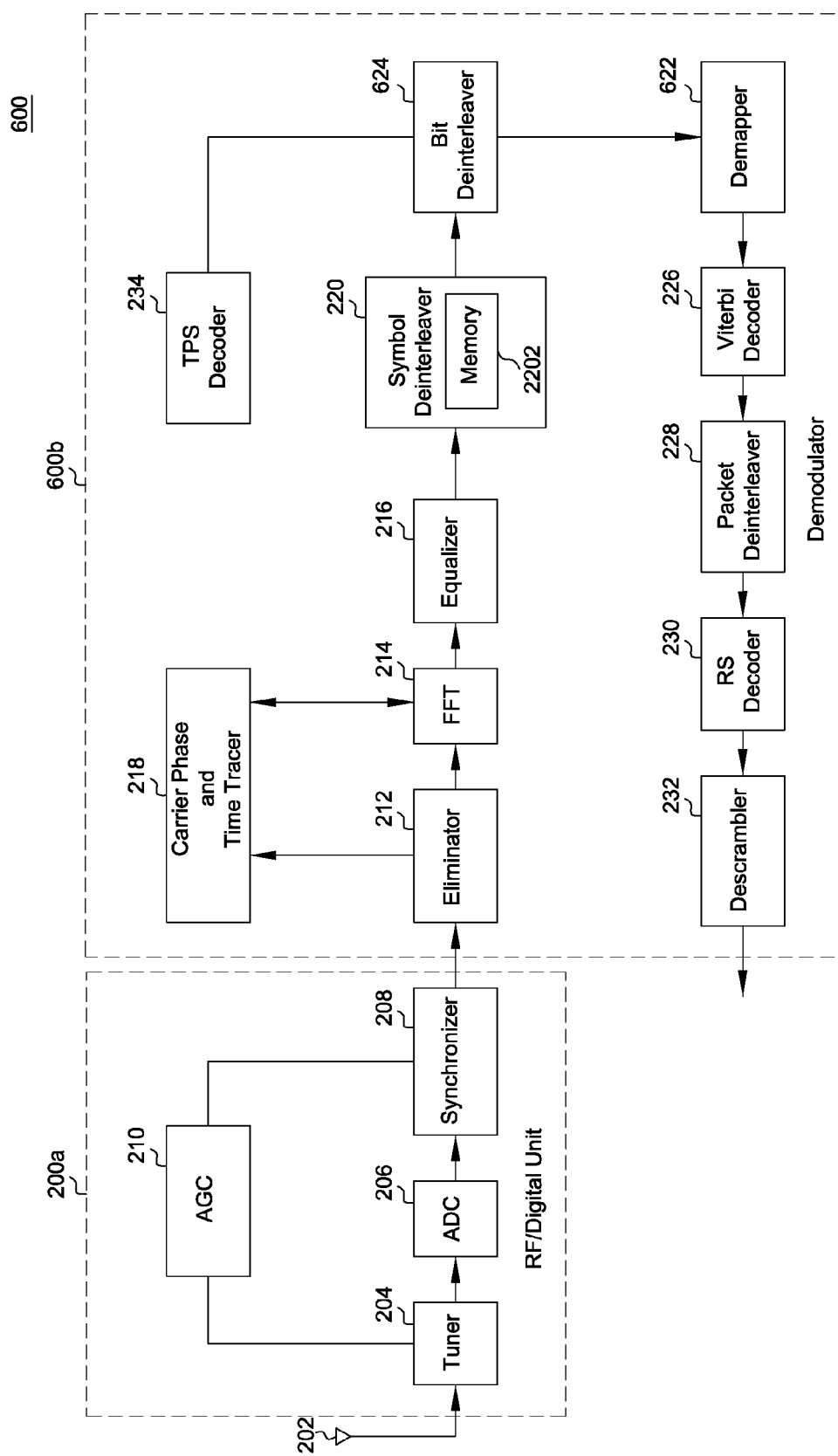
FIG. 6 is a schematic block diagram of another exemplary receiver/demodulator device in accordance with another embodiment.

FIG. 6 is a schematic block diagram of another exemplary receiver/demodulator device in accordance with another embodiment. In FIG. 6, a receiver 600 can be similar to the receiver 200 (in FIG. 2), but can include a demodulator 600b, wherein the bit-deinterleaver can be moved forward and operate in cooperation with the symbol-deinterleaver 220 as a so-called inner-deinterleaver. The symbol deinterleaver 220 can include a symbol-deinterleaving memory 2202 for storing symbol-deinterleaved data, and the bit-deinterleaver 624 can read the symbol-deinterleaved data from the symbol-deinterleaving memory 6202 with a reduced or minimized throughput rate. For the sake of brevity, the descriptions of other elements of FIG. 6 similar to those corresponding to FIG. 2 are omitted.

Figure 7:
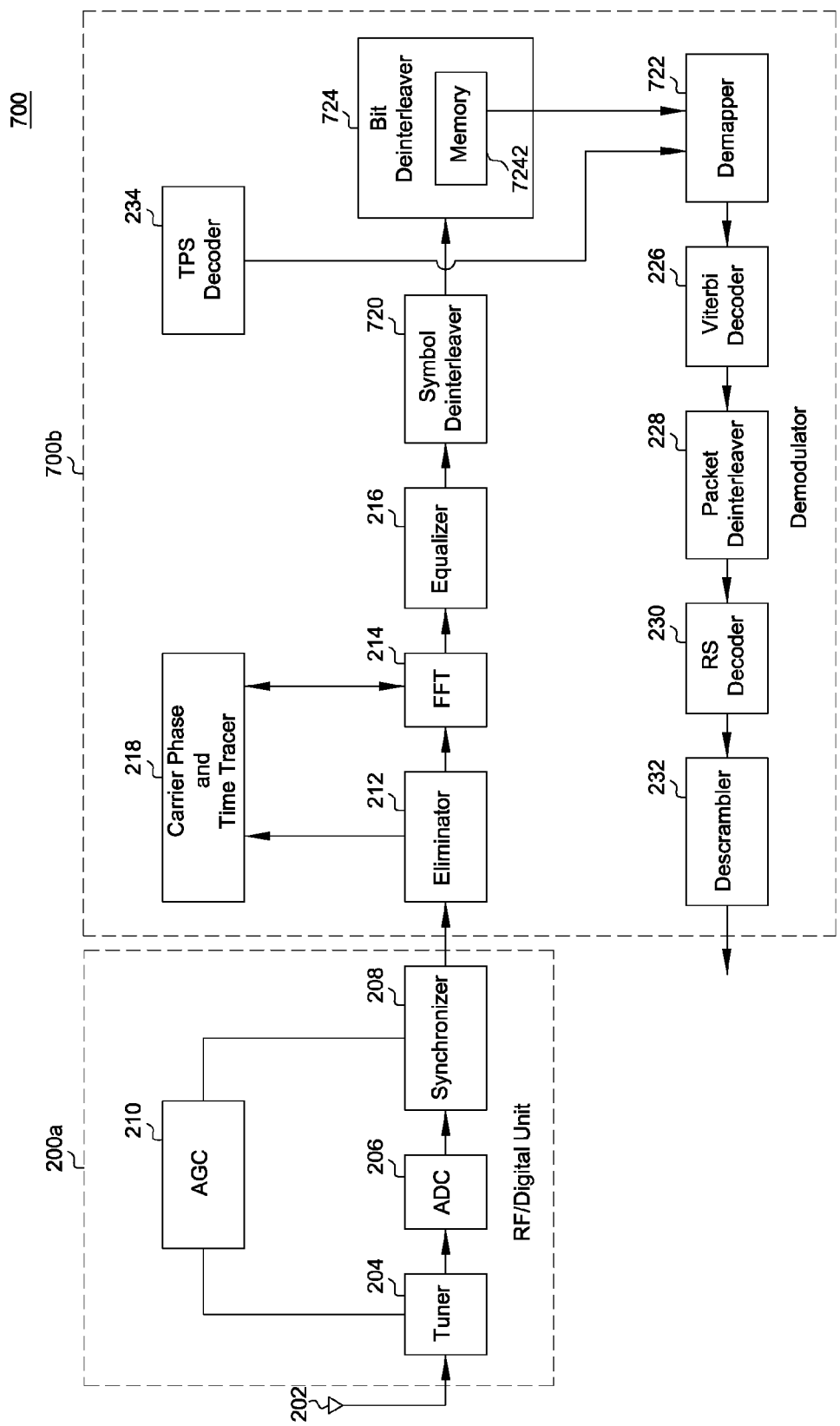
FIG. 7 is a schematic block diagram of another exemplary receiver/demodulator device in accordance with another embodiment.
Figure 8:
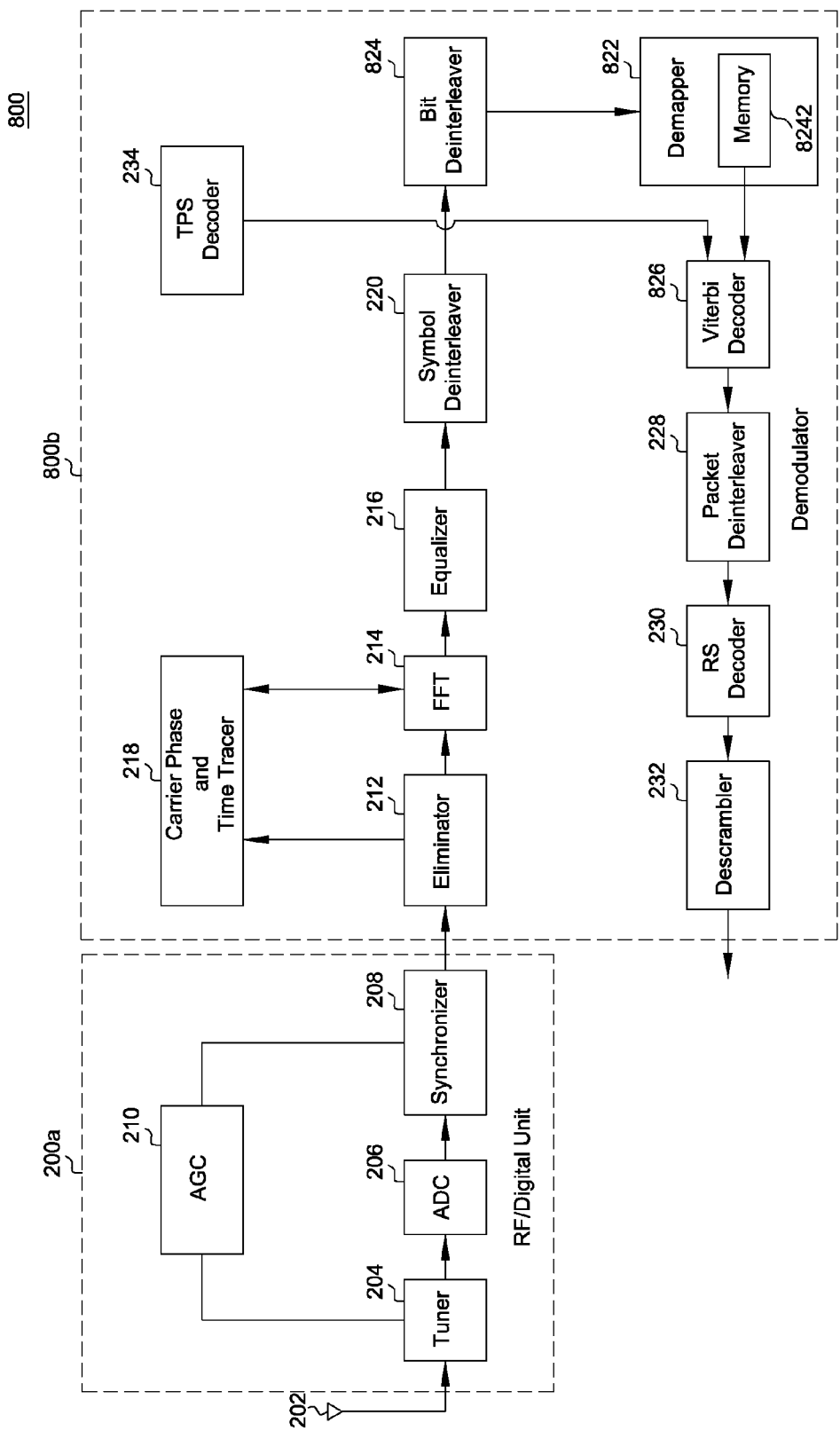
FIG. 8 is a schematic block diagram of another exemplary receiver/demodulator device in accordance with another embodiment.

FIGS. 7 and 8 are schematic block diagrams of other exemplary receiver/demodulator devices in accordance with another embodiments. In FIGS. 7 and 8, the receivers 700 and 800 can both be similar to the receiver 200 (in FIG. 2), but reduction or minimization of throughput rate can be performed between the bit deinterleaver 724 and the demapper 722, and between the demapper 822 and the Viterbi decoder 826, respectively. For the sake of brevity, the descriptions of other elements of FIGS. 7 and 8 similar to those corresponding to FIG. 2 are omitted.

Figure 9:
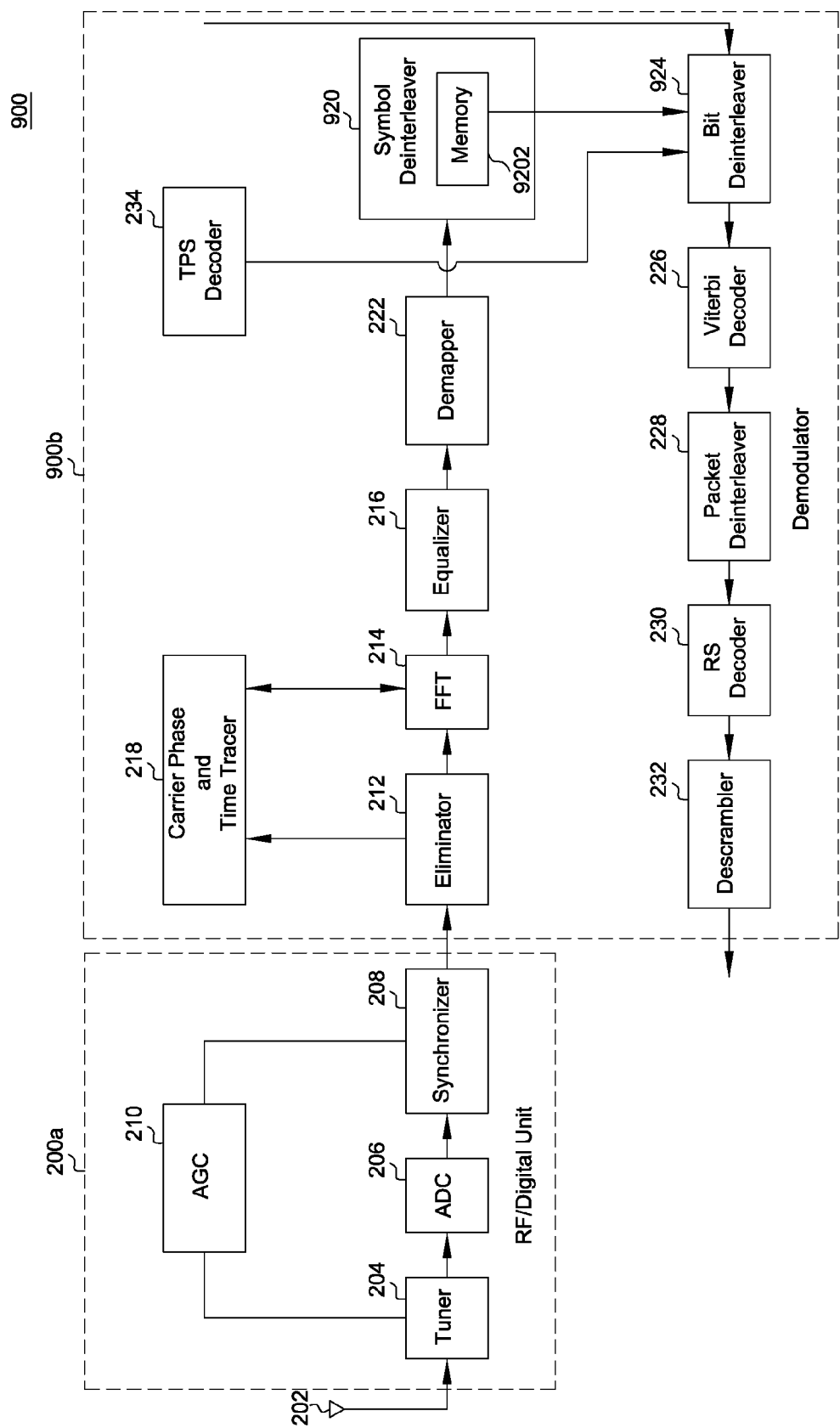
FIG. 9 is a schematic block diagram of another exemplary receiver/demodulator device in accordance with another embodiment.
Figure 10:
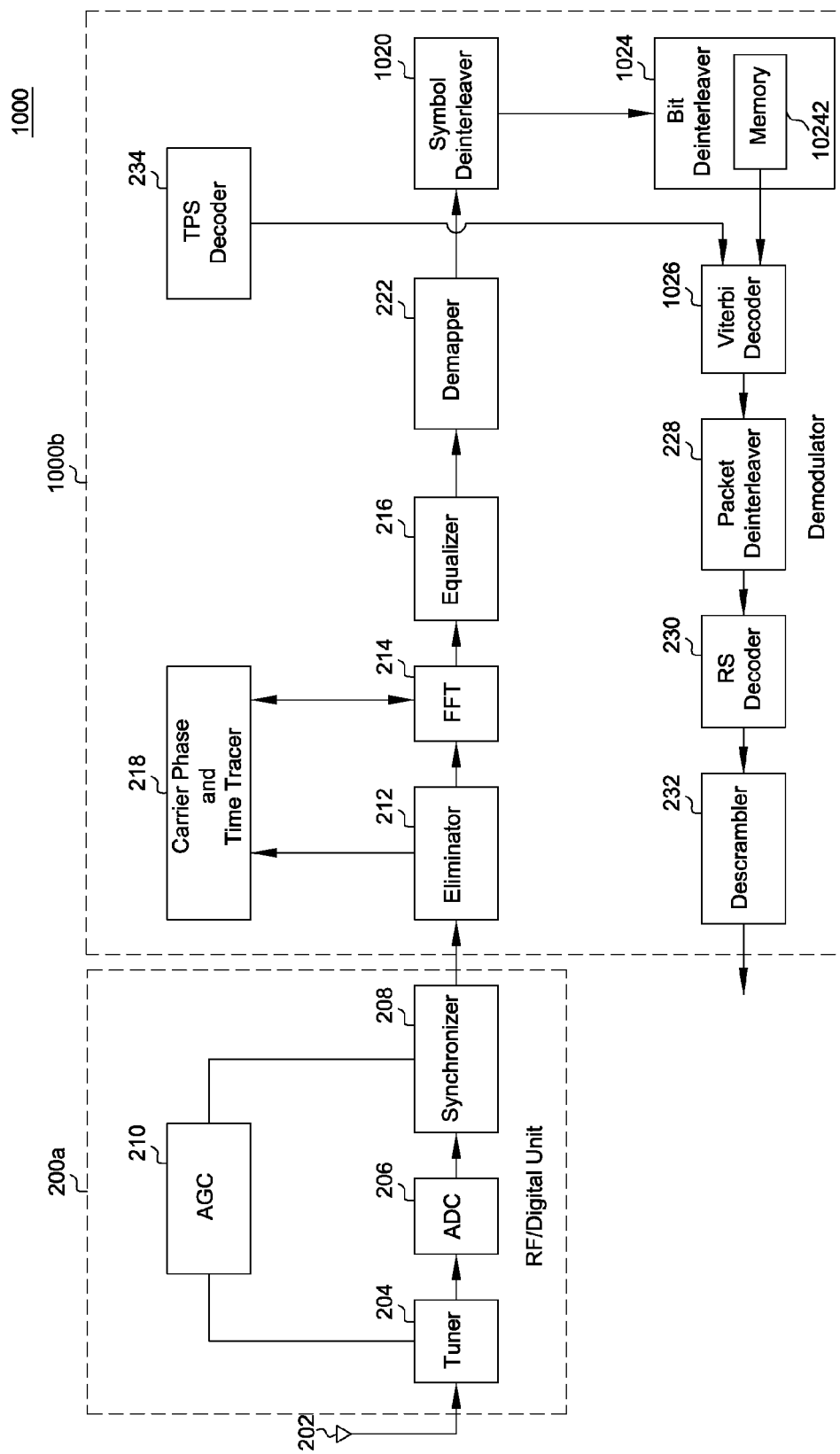
FIG. 10 is a schematic block diagram of another exemplary receiver/demodulator device in accordance with another embodiment.

FIGS. 9 and 10 are schematic block diagrams of other exemplary receiver/demodulator devices in accordance with other embodiments. In FIGS. 9 and 10, the receivers 900 and 1000 can be similar to the receiver 200 (in FIG. 2), but the demapper 222 can be moved to precede the symbol-deinterleaver 920 and 1020, respectively. For the sake of brevity, the descriptions of other elements of FIGS. 9 and 10 similar to those corresponding to FIG. 2 are omitted.

In each of FIGS. 2-10, the throughput rate can be adaptively adjusted to an optimal value, thereby providing improved adaptation to different transmission parameters, and hence improved PCR jitter reduction.

While certain embodiments have been described above, it will be understood that the embodiments described are by way of example only. Accordingly, the device and method described herein should not be limited based on the described embodiments. Rather, the devices and methods described herein should only be limited in light of the claims that follow when taken in conjunction with the above description and accompanying drawings.

What is claimed is:

1. A demodulator device for digital TV receiver, comprising:
a plurality of units adapted to process a transport stream in accordance with a transmission condition of the transport stream, wherein the units include:
a symbol-deinterleaver performing symbol-based deinterleaving;
a bit-deinterleaver performing bit-based deinterleaving;
a demapper performing demapping; and
a Viterbi decoder performing Viterbi decoding,
wherein a first unit among the symbol-deinterleaver, the bit-deinterleaver and the demapper includes a memory storing symbol-deinterleaved data that has undergone symbol deinterleaving and includes a plurality of symbols, and a second unit among the symbol-deinterleaver, the bit-deinterleaver, the demapper and the Viterbi decoder reads the symbol-deinterleaved data with throughput rate equal to 1/(N * a number of data words per symbol in the symbol-deinterleaved data), N being a positive non-zero parameter adjustable according to the transmission condition.

2. The demodulator device of claim 1, wherein the throughput rate is derived by reference to a look-up table that associates a plurality of transmission conditions defined by different combinations of transmission parameters with different values of the parameter N.

3. The demodulator device of claim 2, wherein the transmission parameters include a frame number, a constellation, hierarchy information, a code rate, a guard interval, a transmission mode and cell identification.

4. The demodulator device of claim 3, wherein the demodulator device further comprises a transmission parameter signal decoder for generating the transmission parameters and for providing the transmission parameters to the second unit.

5. The demodulator device of claim 1, wherein the first unit is the symbol-deinterleaver, and the second unit is the demapper.

6. The demodulator device of claim 1, wherein the first unit is the demapper, and the second unit is the Viterbi decoder.

7. The demodulator device of claim 1, wherein the first unit is the demapper, and the second unit is the bit-deinterleaver.

8. The demodulator device of claim 1, wherein the first unit is the bit-deinterleaver, and the second unit is the Viterbi decoder.

9. The demodulator device of claim 1, wherein the first unit is the symbol deinterleaver, and the second unit is the bit-deinterleaver.

10. The demodulator device of claim 1, wherein the first unit is the bit-deinterleaver, and the second unit is the demapper.

11. The demodulator device of claim 2, wherein the transmission conditions are defined by different combinations of two transmission parameters including a transmission mode and a guard interval, the transmission mode including 2K and 8K transmission modes, and the guard interval including values of ¼, ⅛, 1/16 and 1/32, wherein for a same value of the guard interval, the parameter N is similar whether the transmission mode is the 2K or 8K transmission mode.

12. The demodulator device of claim 11, wherein the parameter N is respectively assigned with a first value when the guard interval is equal to ¼, with a second value when the guard interval is equal to ⅛, and with a third value when the guard interval is equal to 1/16 or 1/32, the first value being greater than the second value which is greater than the third value.

13. A demodulation method for a digital TV receiver, comprising:
symbol-deinterleaving a data stream according to a transmission condition;
storing symbol-deinterleaved data that have undergone symbol-deinterleaving in a memory of a first unit; and
through a second unit located downstream from the first unit, reading the symbol-deinterleaved data from the memory at a throughput rate adjusted according to the transmission condition;
wherein the first unit is one of a symbol-deinterleaver, a bit-deinterleaver and a demapper, and the second unit is one of the symbol-deinterleaver, the bit-deinterleaver, the demapper and a Viterbi decoder and
wherein the symbol-deinterleaved data include a plurality of symbols, and the throughput rate is equal to $1/(N * $ a number of data words per symbol in the symbol-deinterleaved data), N being a positive non-zero parameter adjustable according to the transmission condition.

14. The method of claim 13, wherein the parameter N is derived from a look-up table that associates a plurality of transmission conditions defined by different combinations of transmission parameters with different values of the parameter N.

15. The method of claim 14, wherein the transmission parameters include a frame number, a constellation, hierarchy information, a code rate, a guard interval, a transmission mode and cell identification.

16. The method of claim 14, wherein the plurality of transmission conditions are defined by different combinations of two transmission parameters including a transmission mode and a guard interval, the transmission mode including 2K and 8K transmission modes, and the guard interval including values of ¼, ⅛, 1/16 and 1/32, wherein for a same value of the guard interval, the parameter N is similar whether the transmission mode is the 2K or 8K transmission mode.

17. The method of claim 16, wherein the parameter N is respectively assigned with a first value when the guard interval is equal to ¼, with a second value when the guard interval is equal to ⅛, and with a third value when the guard interval is equal to 1/16 or 1/32, the first value being greater than the second value which is greater than the third value.

* * * * *